United States Patent [19]

Myers

[11] 4,164,981
[45] * Aug. 21, 1979

[54] AGRICULTURAL HARVESTING ASSEMBLY

[76] Inventor: Thomas E. Myers, Rte. 5, Box 428, Dade City, Fla. 33525

[*] Notice: The portion of the term of this patent subsequent to Aug. 21, 1993, has been disclaimed.

[21] Appl. No.: 533,000

[22] Filed: Dec. 16, 1974

[51] Int. Cl.² ............................................. A01D 25/00
[52] U.S. Cl. ........................................ 171/50; 171/58; 56/328 TS
[58] Field of Search ............... 56/328 TS; 171/50, 58, 171/11, 33, 52, 55

[56] References Cited

U.S. PATENT DOCUMENTS

| | | | |
|---|---|---|---|
| 887,343 | 5/1908 | McNeal | 171/11 X |
| 1,942,011 | 1/1934 | Urschel | 171/55 |
| 2,609,648 | 9/1952 | Larson | 171/52 |

Primary Examiner—Hugh R. Chamblee
Attorney, Agent, or Firm—Stein & Frijouf

[57] ABSTRACT

An agricultural harvesting assembly designed to remove vines and like undesirable growth from cultivated trees, plants and the like, comprising a frame movably and adjustably attachable to a tractor or like towing vehicle. A gripping head is movable and adjustably attached to the frame by an orienting means movably interconnected between the gripping head and the frame in such a manner as to absorb shock when the gripping head engages a tree from which vines are to be removed. Head disposition means and additional adjustment means are mounted on said frame and movably interconnected relative to the gripping head so as to position the gripping head between an operative and non-operative position and also in predetermined path of travel relative to a tree or obstacle intended to be encountered.

15 Claims, 4 Drawing Figures

AGRICULTURAL HARVESTING ASSEMBLY

BACKGROUND OF THE INVENTION

1. Field of the Invention

An agricultural assembly designed to be towed behind a tractor or the like and designed to uproot and/or disengage vines and like undesirable growth from trees or like plants wherein the assembly travels, by virtue of the towing vehicle, continuously along rows of the cultivated trees.

2. Description of the Prior Art

The removal of certain undesirable growth, such as vines, weeds, etc., from cultivated plants has been a major problem in agriculture since man has been directing his efforts to the growing and harvesting of plants. Similarly, man, over the years, has attempted to devise practical and efficient apparatus and methods of removing or otherwise disposing of such undesirable growth so that the cultivated plants could flourish. Such previously contemplated means of disposing of undesirable growth ranges from complicated and expensive harvesting equipment to chemical application. The particular means utilized by necessity depends upon the particular application to which these means are applied. Frequently it has been found that the application of a chemical, in order to kill undesirable growth, results in harmful effects to the cultivated plants themselves.

A particular problem in the citrus industry, as well as in other agricultural areas primarily directed to the cultivation of large numbers of trees, is the removal of vines from trees. Vine growth, if left unchecked, can literally overpower citrus and like fruit bearing trees. It has become a prior art practice to attempt to destroy such vines by severing of the vines at or near the base of the tree or the ground from which the vines are growing. In the past, this has most commonly been done either manually or with make-shift machinery. The disadvantages of manually attempting to dispose of such vines or growth is obvious. It would be economically impossible to cut or uproot vines or the like due to the time involved and the resulting cost of such manual labor.

Inherent disadvantages are present with numerous prior art machinery attempting to overcome this problem. Generally, such machinery is found to be either inefficient in that the vines are not effectively disposed of or, alternately, the trees in which the vines become entangled are severely damaged. It also well recognized that disposition of these vines would be best accomplished by the complete uprooting of the vines themselves in order to prohibit, or delay as long as possible, the regrowing of the vine. Mere cutting or severing of the vine at or near their roots burdensome postpones, for a relatively short period, the regrowth of the vine back into the cultivated trees. However, particular machinery adapted to uproot such vines has been found to be prohibitively expensive and has not overcome the problem of tree damage when applied in actual operation.

Accordingly, it is recognized in the agricultural industry that there is a great need for a structure that can efficiently, quickly and inexpensively dispose of vine-type growth from cultivated citrus trees and the like by means of uprooting such vines so as to prohibit their regrowth and thereby delay, as long as possible, the burdensom entanglement of such vine growth in the trees attempting to be cultivated.

SUMMARY OF THE INVENTION

This invention relates to an agricultural assembly designed primarily to be used in combination with a tractor or like towing vehicle for the purpose of quickly and efficiently removing, through the uprooting, of vines and like undesirable growth from cirtrus trees or like cultivated plants, etc.

More specifically, the present invention comprises a frame means movably and adjustably attachable to the rear of a tractor or like prime mover vehicle which serves to tow or otherwise propel the assembly along the rows of cultivated trees. A gripping head extends outwardly into a predetermined path of travel from the frame wherein the gripping head is specifically disposed to repeatedly engage the successively arranged trees. By virtue of this arrangement, the assembly can be towed behind the prime mover vehicle and thereby travel along the rows of trees of the grove or orchard. The gripping head itself is movably interconnected to the frame means by an orienting means movably attached to the frame at one end and to the gripping head at the other. The gripping head includes a plurality of successively arranged, object engaging elements. Ideally, these elements may be in the form of discs made from an elastic or flexible material and disposed along the substantially leading edge of a bracket on which they are mounted. By virtue the disposition of the gripping head relative to the frame as the assembly travels along the various rows of trees, these elements will actually engage the trees, become entangled with the vine contained thereon or thereabout, and uproot these vines as the assembly continues to move.

By virtue of the elastic or flexible material from which the discs or object engaging elements are formed, certain shock occurring upon engagement therebetween is absorbed thereby. Shock is additionally absorbed by virtue of the pivotal connection between the bracket of the gripping head and the orienting means itself. The assembly comprises biasing means including a first biasing element interconnected between the gripping head bracket and the orienting means. The disposition of this first biasing element and the fact that the bracket is pivotally connected to the orienting means allows a pivotal movement between the gripping head and the orienting means and thereby provides an additional shock absorbing feature as the gripping head engages the tree and passes thereby. The biasing means further comprises a second biasing element mounted on the orienting means and interconnected between the orienting means and the frame means. The orienting means is also pivotally connected to the frame means at one end thereof and by virtue of this pivotal connection and the disposition of the second biasing element, pivotal movement of the orienting means also occurs due to the "drag" exerted on the gripping head as it engages a tree and is dragged thereby. it can readily be seen that an additional shock absorbing effect results as additional tension is applied to the second biasing element causing outward or pivotal movement of the orienting means relative to the frame.

For added versatility, adjusting means is mounted on the frame and at least in part, interconnected to the orienting means and, accordingly, is disposed relative to the gripping head to position it in an outwardly extending, predetermined relation relative to the frame and the path of the travel of the frame as it moves along the various rows of trees being treated. The adjusting means comprises a threaded shaft and jack assembly whereby activation of the jack along the threaded shaft moves the orienting means and attached gripping head outwardly or inwardly in a substantially perpendicular relation to the path of travel of the vehicle and attached frame means. Accordingly, the gripping head can be properly positioned in predetermined relation to a row of trees which are intended to be actually engaged, and from which the vines are intended to be removed. The adjusting means further comprises a height regulating assembly wherein the height of the frame may be regulated relative to the connection or interconnected linkage between the tractor or towing vehicle and the frame itself.

The agricultural assembly further comprises a head disposition means interconnected between the frame and, ideally, the orienting means. Preferably, this head disposition means comprises a fluid actuated piston and cylinder assembly whereby the gripping head and orienting means, being attached to one another, is moved between an operative and inoperative position. These positions are defined by a completely outwardly extending orientation for tree engagement and a raised, angularly oriented disposition relative to the ground over which the frame is traveling, respectively.

Additional structural features of the present invention include a support means which may be in the form of wheels, slides or the like attached to the frame or orienting means. This support means is disposed in ground engaging relation and allows the weight of the frame and attached orienting means and gripping head to essentially rest thereon so as to maintain the frame and attached elements at a predetermined attitutde as the assembly travels along the various rows of trees being treated.

The invention accordingly compises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention reference should be had to the following detailed description taken in connection with the accompanying drawings in which.

Similar reference characters refer to similar parts throughout the several views of the drawings.

DETAILED DESCRIPTION

Figure 1:
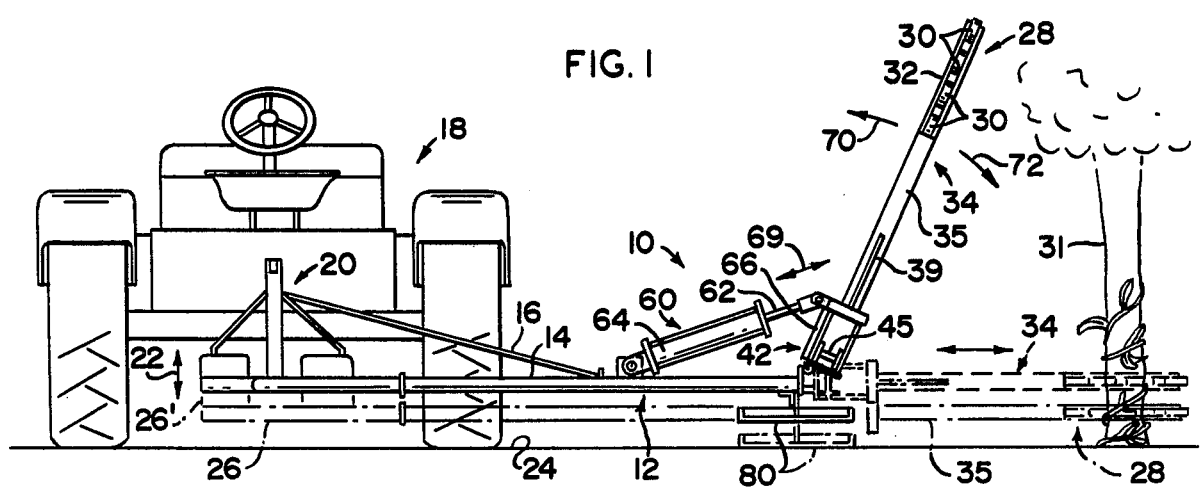
FIG. 1 is a rear view showing the assembly of the present invention attached to a towing vehicle and further showing the gripping head and orienting means disposed in an operative position (broken lines) and an inoperative position raised above the frame of the assembly.
Figure 2:
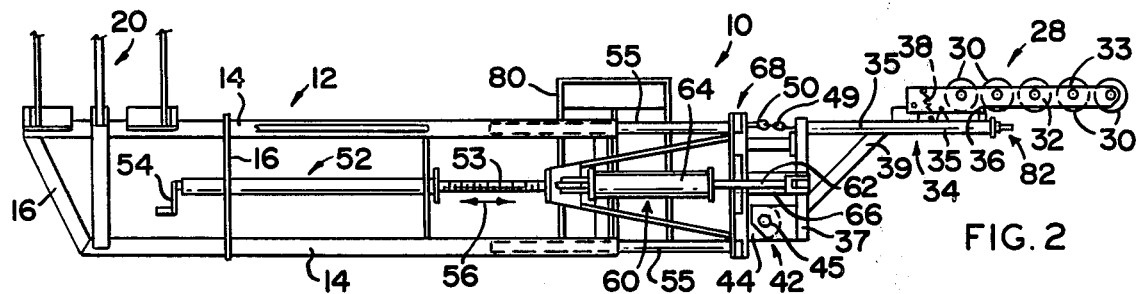
FIG. 2 is a top, partial cutaway view of the elements of the assembly in operative position.

This invention relates to an agricultural assembly as shown in FIGS. 1 and 2 and generally represented therein as 10. The assembly comprises a frame, generally indicated as 12, including main braces 14 and cross braces or support rods 16. The frame is attached to a prime mover-type vehicle generally represented as 18, and is attached thereto so as to be towed by means of a hitch assembly generally indicated as 20 in FIGS. 1 and 2. It should be noted that the scope of the present invention is not intended to include the prime mover-type vehicle 18, per se. This vehicle could be any type of vehicle capable of towing or pulling the assembly 10 in a predetermined direction or move the assembly as intended.

Irrespective of the type of vehicle utilized, hitch assembly 20, as indicated by directional arrow 22, is adjustable to the extent that the frame 12, attached thereto, may be raised and lowered so as to, in turn, regulate the relative height of the frame means 12 relative to the ground 24, or other supporting surface over which the frame and towing vehicle 18 travels. The various positions of this frame means are indicated in broken lines and represented as 26 and 26'. Naturally, the positioning of the frame relative to the ground 24 can be infinitely varied over the range of movement of the hitch assembly 20. This hitch assembly itself can be of conventional design and may be either manually or automatically adjusted. Automatic adjustment can take place through conventional hydraulic piston and cylinder assemblies as is well known in the art. This movable attachment between the frame means and the towing vehicle 18 comprises a part of an adjusting means additionally mounted on the frame means, the remainder of which will be discussed in detail hereinafter.

Figure 3:
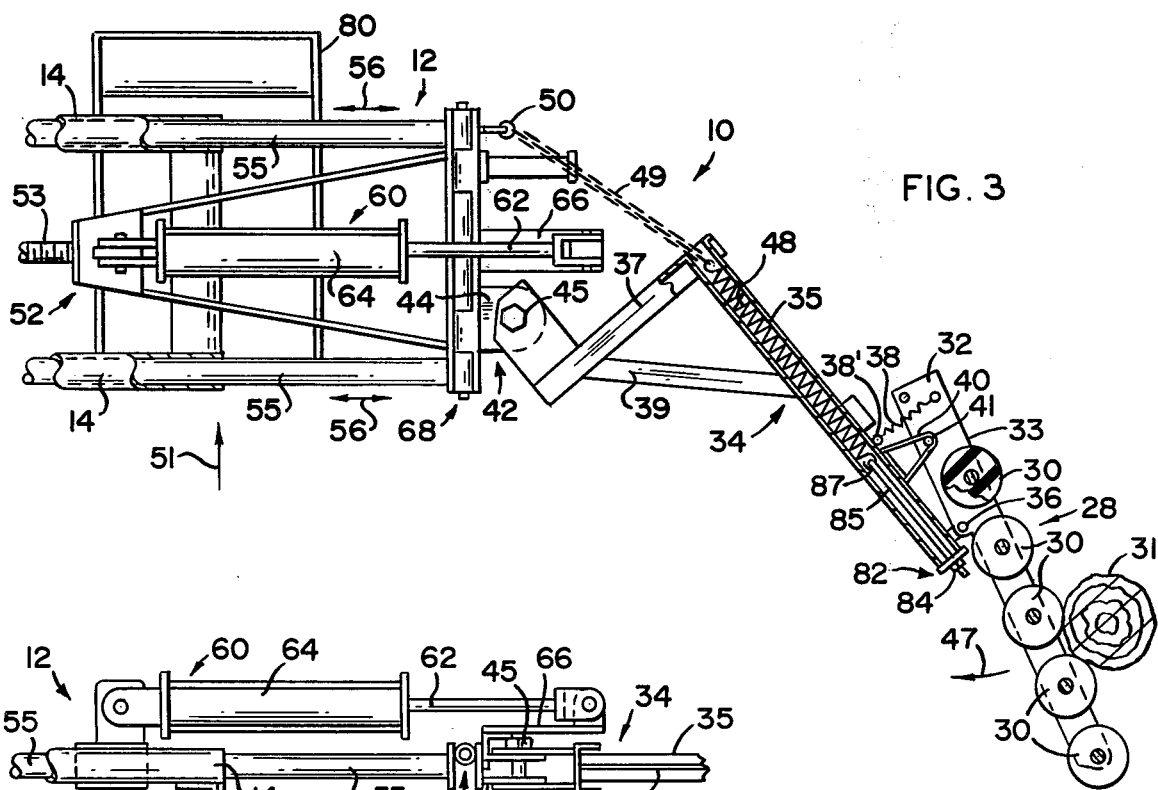
FIG. 3 is a partial cutaway view showing the relation between the gripping head, orienting means, frame, and head disposition means.

With reference to FIGS. 1, 2, and 3, the assembly further comprises a gripping head generally indicated as 28. The gripping head 28 includes a plurality of object engaging elements in the form of discs 30 disposed in spaced, successive relation to one another and positioned in sbustantially protruding relation on bracket 32 relative to the leading edge 33 of bracket 32. The discs or object engaging elements 30 are made from a flexible or elastic material capable of deforming upon engagement with a relatively fixed or rigid object such as tree 31. Because of the structure of the elements 30, shock is absorbed thereby as these elements actually engage tree 31 upon movement thereby of the gripping head 28 and the remainder of the assembly being towed behind the prime mover vehicle 18. This prevents damage to the base of the tree being engaged as well as prohibits the shock which is delivered to the gripping head and the remainder of the assemly from doing structural damage to the assembly itself. The bracket 32 of the gripping head is pivotally mounted to the orienting means generally indicated as 34 by connector element 36. In addition, biasing means comprising a first biasing element 38 is interconnected between the bracket 32 and a portion of the orienting means 34 as at 38'. A stop or other movement regulating means 40 in the form of an angled bracket is mounted on orienting means 34 as shown, and is positioned to engage pin 41 so as to regulate the outward or pivotal movement of bracket 32 as it engages and passes by tree 31 as best shown in FIG. 3.

The orienting means itself 34 is structured and configured into a substantially L-shaped arm having a main leg 35 and interconnecting leg 37 positioned between main leg 35 and a pivotal connector generally indicated as 42. A cross brace element 39 serves to interconnect the legs 35 and 37 in supporting relation to one another. It should be noted that the particular L-shaped configuration of orienting means 34 is not considered to be a requisite but, in the particular embodiment shown in FIG. 3, is an efficient configuration to accomplish the intended function of the orienting means as more fully described hereinafter.

It can readily be seen that, due to pivotal connector 42, the orienting means is pivotally or otherwise movably connected relative to the frame means 12. A tongue element 44 is fixedly attached to frame 12 to support pin 45 to rotate the connector 42 and arm 37. Such rotation occurs as gripping head 28 reaches its maximum limit of rotation as indicated by directional arrow 47 which, in turn, is defined by pin 41 engaging in a stopping relation to stop member 40. This transfers the exerted force through gripping head 28 onto orienting means 34 and cuases pivotal movement of orienting means relative to frame 12 about connector 42. The biasing means previously referred to further includes a second biasing element 48 in the form of an elongated spring element mounted on the interior of arm 35. A chain or other type of connecting element 49 is interconnected between a chain connector 50 secured to the frame 12 and one end of the spring element or biasing means 48 as shown in FIG. 3. The chain connector 50 is fixedly attached to the frame means 12 and, as the frame itself moves along in the intended direction as indicated by directional arrow 51, and further as the gripping head 28 reaches its maximum position of rotation (FIG. 3) the continued force will be exerted on the second biasing element 48 causing its extension due to its connection with chain 49 attached to the frame 12 as discussed. It can be readily seen that an additional shock absorbing feature is thereby created in that the biasing force exerted by spring element 48 absorbs the shock exerted on the gripping head in orienting means due to their engagement with the tree 31 as the entire assembly passes along the direction indicated by directional arrow 51.

As shown primarily in FIG. 2, the adjusting means, mentioned above, further comprises an elongated threaded shaft operatively connected to a jack assembly 52 wherein activation of jack handle 54 causes relative movement between shaft 53 and jack assembly 52 and, accordingly, relative movement between the end portion of frame 12 indicated as legs 55 and the remaining portion in which the legs 55 are telescopically mounted (FIGS. 2 and 3). As indicated by directional arrows 56, the activation of the adjusting means, and more particularly the shaft and jack assembly 53 and 52 cause relative movement of the legs 55 and, accordingly, the orienting means and gripping head as shown. Adjustment of this portion of the adjusting means properly positions the gripping head into a predetermined position or predetermined path of travel relative to successively positioned trees 31. It should be noted that operation of the threaded shaft 53 and jack assembly 52 can be done either manually or automatically through proper gearing from a power takeoff located on the frame or being a part of the prime mover vehicle 18.

Figure 4:
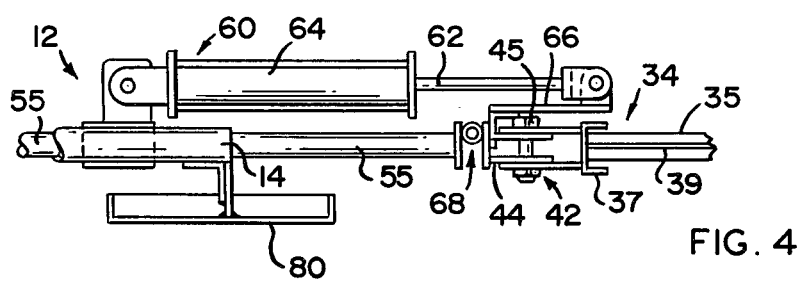
FIG. 4 is a side, partial cutaway view of the head disposition means interconnected between the orienting means and the frame and also showing the support means arranged in supporting relation between the ground and the frame itself.

Gripping head diposition means generally indicated assembly 62 FIG. 4 as 60 includes a piston and cylinder assembly62 and 64 respectively, movably attached to the orienting means 34 by means of rigidly connected flange 66. A pivot or hinge assembly generally indicated as 68 serves to interconnect the orienting means 34 to the remainder of the frame 12. Upon activation of the head disposition means 60 in a retracted position, piston 62 will be withdrawn into cylinder 64 causing movement of the head disposition means 60 in the direction indicated by directional arrow 69 (FIG. 1). This causes rotation of the gripping head and attached orienting means in the direction indicated by directional arrows 70 and 72 respectively, dependent upon whether the piston 62 is traveling into or out of cylinder 64 of the head positioning assembly 60. When the gripping head and orienting means travels in the direction indicated by directionl arrow 70 the gripping head is moved to its non-operative position as generally represented in FIG. 1. This inoperative position is utilized when the entire assembly is being transported and is not intended to be placed in actual operative engagement with a plurality of trees, as explained above.

Additional struuctural features of the present invention comprise (FIG. 4) a support means in the form of a sled or the like 80 arranged in supporting relation to the frame 12 and particularly the elongated brace or beam 14 comprising the frame. This sled 80 is positioned in ground engaging relationship (FIG. 1) in broken lnes for the purpose of supporting the weight of the frame as it travels in its operative position. When the gripping head and orienting means are moved to its inoperative position (FIG. 1) the entire frame is raised b virtue of the hitch assembly 20 and this, in turn, causes te support means 80 to be moved out of its supporting relation relative to the ground 24. It should be noted that the sled 80 could be replaced by proper wheel means or other supporting means applicable to movably support the frame when in its operative position.

Another structural feature of the present invention comprises a bias suggesting means generally indicated as 82 and in including an elongated threaded bolt cooperatively engaging the collar and nut means 84. The threaded bolt or shaft 85 is fixedly attached to end 87 of the second biasing element 48 such that upon relative movement of collar and/or nut element 84 relative to the shaft 85, te tension on the second biasing element 48 can be adjusted. This, of course, in turn, adjusts the tension or force required to extend or pivot the orienting means 34 away from the remainder of the frame 12, as best shown in FIG. 3.

It will thus be seen that the objects made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Now that the invention has been described,
What is claimed is:

1. An agricultural assembly primarily designed for removing vines and like growth extending from the ground and secured to the upper portion of a tree with the vine or like growth being spaced from the trunk of the tree, the agriculture assembly normally operated in towed relation to a prime mover type vehicle; said agriculture assembly comprising: frame means movably connected in towed relation to the prime mover type vehicle, a gripping head movably mounted on said frame, orienting means connected to said gripping head and disposed to at least partially define the path of travel of said gripping head relative to said frame, biasing means connected to said orienting means and disposed to normally bias said head into a substantially predetermined position relative to the path of travel of said frame to remove the vines or like growth from the ground as said gripping head travels relative to the tree; and said biasing means disposed relative to said gripping head, orienting means and said frame means for absorbing the shock when said gripping head engages the tree and for enabling movement of said gripping head from said substantially predetermined position as the gripping head engages the tree and passes thereby.

2. An assembly as in claim 1 wherein said orienting means comprises an arm assembly movably interconnected between said gripping head and said frame means, said biasing means interconnected at least between said frame and said arm assembly, whereby said biasing means is at least partially disposed in shock absorbing relation to said gripping head and the tree.

3. An assembly as in claim 1 wherein said orienting means comprises an arm assembly movably interconnected between said gripping head and said frame means, said biasing means interconnected at least between said gripping head and said arm assembly whereby said biasing means is at least partially disposed in shock absorbing relation to said gripping head and the tree.

4. An assembly as in claim 1 wherein said gripping head comprises a plurality of obstacle engaging elements disposed in substantially spaced, successive relation to one another along the substantially leading edge of said gripping head, said elements formed from a substantially elastic material, whereby at least a portion of shock is absorbed when said gripping head engages the tree.

5. An assembly as in claim 1 further comprising support means connected in supporting relation relative to the ground, to said frame means and movably engageable with the ground over which said agricultural assembly travels.

6. An assembly as in claim 1 further comprising bias adjusting means movably attached to said biasing means and disposable relative thereto so as to adjust the biasing tension thereon.

7. An assembly as in claim 1 wherein said gripping head is pivotally connected to said orienting means, said biasing means comprising a first biasing element interconnected between said gripping head and said orienting means disposed to normally bias said gripping head into said substantially predetermined position relative to the path of travel of said frame.

8. An assembly as in claim 7 wherein said biasing means further comprises a second biasing element interconnected between said orienting means and said frame, each of said first and second biasing elements disposed to at least partially absorb shock upon engagement of said gripping head with the tree in the path of travel thereof.

9. An assembly as in claim 8 wherein said first and second biasing elements each comprise spring elements interconnected between said gripping head and said orienting means, and said orienting means and said frame means respectively.

10. An assembly as in claim 1 further comprising head disposition means mounted on said frame and disposed in movable relation to said moving head between an operative and a non-operative position.

11. An assembly as in claim 10 wherein said head disposition means comprises a fluid and cylinder assembly oriented to move in a substantially angular path of travel relative to the ground over which said frame means travels.

12. An assembly as in claim 1 further comprising adjusting means mounted on said frame and attached in movable relation to said gripping head, said adjusting means disposed relative to said frame and said gripping head such that said gripping head may be positioned in predetermined outwardly extending disposition relative to said frame.

13. An assembly as in claim 12 wherein said adjusting means comprises a threaded shaft and jack assembly.

14. An assembly as in claim 12 wherein said adjusting means is interconnected between said frame and said orienting means and disposed relative to said gripping head, said orienting means attached to said gripping head so as to position it in outwardly extending relation to said frame.

15. An assembly as in claim 14 wherein said orienting means is telescopically connected to said frame and interconnected thereto by said adjusting means, whereby activation of said adjusting means causes relative movement between said orienting means and said frame.

* * * * *